United States Patent
Lee et al.

(10) Patent No.: US 8,509,184 B2
(45) Date of Patent: Aug. 13, 2013

(54) DATA FORWARDING APPARATUS AND METHOD FOR REDUCING HANDOVER INTERRUPTION TIME IN A WIRELESS COMMUNICATION SYSTEM

(75) Inventors: Ok-Seon Lee, Suwon-si (KR); Sang-Min Lee, Seoul (KR); Ju-Yeop Kim, Anyang-si (KR); Jung-Min Moon, Seoul (KR); Dong-Ho Cho, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 574 days.

(21) Appl. No.: 12/765,278

(22) Filed: Apr. 22, 2010

(65) Prior Publication Data

US 2010/0272065 A1 Oct. 28, 2010

(30) Foreign Application Priority Data

Apr. 23, 2009 (KR) .................. 10-2009-0035339

(51) Int. Cl.
*H04W 4/00* (2009.01)
(52) U.S. Cl.
USPC ........... 370/331; 370/335; 370/350; 370/338; 455/436; 455/444; 455/502
(58) Field of Classification Search
USPC . 455/436–444, 449, 502, 560; 370/331–333, 370/350
See application file for complete search history.

(56) References Cited

U.S. PATENT DOCUMENTS

| | | | | |
|---|---|---|---|---|
| 5,440,561 | A * | 8/1995 | Werronen | 370/337 |
| 7,450,944 | B2 * | 11/2008 | Leelahakriengkrai et al. | 455/436 |
| 7,469,142 | B2 * | 12/2008 | Nelakanti et al. | 455/436 |
| 8,077,671 | B2 * | 12/2011 | Lee et al. | 370/331 |
| 8,274,947 | B1 * | 9/2012 | Fang et al. | 370/331 |
| 2002/0160779 | A1 * | 10/2002 | Arazi et al. | 455/444 |
| 2003/0053431 | A1 * | 3/2003 | Madour | 370/331 |
| 2003/0147370 | A1 * | 8/2003 | Wu | 370/338 |
| 2007/0015511 | A1 * | 1/2007 | Kwun et al. | 455/436 |
| 2009/0046665 | A1 | 2/2009 | Robson et al. | |
| 2009/0070469 | A1 | 3/2009 | Roach et al. | |
| 2010/0003981 | A1 * | 1/2010 | Ahluwalia | 455/436 |
| 2010/0056160 | A1 * | 3/2010 | Kim et al. | 455/444 |
| 2010/0142485 | A1 * | 6/2010 | Lee et al. | 370/331 |
| 2010/0260156 | A1 * | 10/2010 | Lee et al. | 370/336 |
| 2010/0278150 | A1 * | 11/2010 | Park et al. | 370/332 |
| 2011/0103347 | A1 * | 5/2011 | Dimou | 370/331 |
| 2012/0177006 | A1 * | 7/2012 | Tsai et al. | 370/331 |

FOREIGN PATENT DOCUMENTS

KR 10-2008-0050183 A 6/2008

* cited by examiner

*Primary Examiner* — Sharad Rampuria
(74) *Attorney, Agent, or Firm* — Jefferson IP Law, LLP

(57) ABSTRACT

A data forwarding apparatus and method for reducing a HandOver (HO) interruption time in a wireless communication system where a macro cell and a femto cell coexist are provided. An operation method of a Mobile Station (MS) for data forwarding in a wireless communication system includes synchronizing with a serving Base Station (BS) after completing a HO procedure with a target BS, and receiving data packets existing in a queue through an air link directly from the serving BS.

23 Claims, 12 Drawing Sheets

DATA FORWARDING APPARATUS AND METHOD FOR REDUCING HANDOVER INTERRUPTION TIME IN A WIRELESS COMMUNICATION SYSTEM

PRIORITY

This application claims the benefit under 35 U.S.C. §119 (a) of a Korean patent application filed in the Korean Intellectual Property Office on Apr. 23, 2009 and assigned Serial No. 10-2009-0035339, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd., and 2) Korea Advanced Institute of Science and Technology.

BACKGROUND OF THE INVENTION

1. Field of the Invention

The present invention relates to a wireless communication system. More particularly, the present invention relates to a data forwarding apparatus and method for reducing a HandOver (HO) interruption time in a wireless communication system.

2. Description of the Related Art

Many wireless communication technologies have been proposed as candidates to support high speed mobile communication. Among these, the Orthogonal Frequency Division Multiplexing (OFDM) technology is now recognized as a leading next-generation wireless communication technology. In the future, it is expected that the OFDM technology will be used in most wireless communication technologies. At present, even the Institute Electrical and Electronics Engineers (IEEE) 802.16 Wireless Metropolitan Area Network (WMAN), referred to as a 3.5-Generation (3.5G) technology, has adopted the OFDM technology.

The OFDM scheme transmits data using a multi-carrier. Namely, the OFDM scheme is a type of Multi Carrier Modulation (MCM) scheme of parallel-converting symbol streams input in series and modulating each of the symbol streams into a plurality of sub-carriers having cross orthogonality (i.e., a plurality of sub-channels) for transmission.

In a cellular wireless communication system, there occurs a phenomenon in which a communication between a Mobile Station (MS) and a Base Station (BS) fails because a channel state deteriorates due to, for example, geographical conditions within a cell, a distance between the MS and the BS, a movement of the MS, and the like. For example, a propagation shadow area is formed even in a service area of the BS by a sealed building such as an office or a house. If the MS is positioned in the propagation shadow area, the BS may fail to reliably perform communication with the MS because of a poor channel state between the BS and the MS.

Thus, the wireless communication system may include a femto cell to provide a high speed data service while addressing a service problem in the propagation shadow area. A Femto cell is a small cell area formed by a compact BS, which is installed indoors such as in an office, a house, etc. The femto cell has access to a mobile communication core network through a broadband network. The compact BS, which is a small output BS and may be installed, for example, by a home owner or an MS user in an office, is referred to as a micro BS, a self configurable BS, an indoor BS, a home BS, a femto BS, etc. In the following description, the compact BS is referred to as the femto BS.

On the other hand, in order to guarantee the mobility of an MS, a wireless communication system including only a macro cell allows the MS to perform an HO procedure when leaving one macro cell and entering another macro cell. Thus, the MS performs the HO procedure by being in synchronization with a target BS and sending a HO confirmation message to the target BS. After that, the MS, which was serviced by a previous BS, establishes service with the target BS. At that time, data packets of the MS existing in a queue of the previous BS are transmitted to the target BS through a backbone network (i.e., a core network). This operation is referred to as 'data forwarding'.

Handover interruption time is a performance indicator of great significance to a HO procedure. When performing the HO, an MS releases a connection with a previous BS and attempts to establish a connection with a target BS. Here, the HO interruption time can be defined as a period of time ranging from the moment of releasing the connection with the previous BS to a time of establishing the connection with the target BS and receiving new data packets from the target BS. The HO interruption time is an important performance indicator because it assists in determining if the continuity of service is maintained, i.e., a seamless service is possible. The HO interruption time is affected by a time of performing an HO procedure with the target BS. However, it is further affected by the period of time for receiving the new data packets from the target BS. That is, the HO interruption time is determined depending on when data packets of an MS, which are first transmitted from the previous BS to the target BS after the end of the HO procedure with the target BS, are transmitted to the MS.

In a case in which an MS exits a macro cell area and enters a femto cell area in a wireless communication system where a macro cell and a femto cell coexist, an HO from the macro cell to the femto cell is performed. At this time, if the existing HO technology between macro cells is applied to the HO from the macro cell to the femto cell, a macro BS attempts data forwarding through a backbone network. The femto cell maintains connectivity with the backbone network through an Internet Service Provider (ISP) network. By using the connection through the ISP, data packets are transmitted through the macro BS, a macro Mobility Management Entity (MME), a femto MME, an ISP network, and the femto BS. Based on this path, data traffic introduced into the femto BS experiences a latency effect caused by the ISP network. The latency due to the ISP network is different according to node distance. However, in IEEE 802.16m Evaluation Methodology Document (EMD), the latency is shown by the Laplacian distribution of an average of 80 ms. Because the latency time in the ISP network is long, data packets transmitted by the macro BS reach the femto BS late. Thus, even after performing the HO to the femto BS, an MS cannot receive data packets through data forwarding until waiting for a predetermined time. This results in an increase of the HO interruption time, thus causing a problem in which an MS receiving a Voice over Internet Protocol (VoIP) or video streaming service suffers from a service cut-off phenomenon.

A fundamental cause of the increase of the HO interruption time is that the data forwarding by the macro BS goes through the ISP network. Basically, the time taken to go through the ISP network is an average of 80 ms. Furthermore, the ISP network has difficulty in guaranteeing a Quality of Service (QoS) of data packets. Because of this, latency can further increase according to traffic loading. And, because of a sudden increase of Internet traffic indoors where the femto BS is installed, there occurs a bottleneck phenomenon in the line supplying the femto BS indoors, thus causing an even greater increase of latency in transmitting data packets.

SUMMARY OF THE INVENTION

An aspect of the present invention is to address at least the above mentioned problems and/or disadvantages and provide at least the advantages described below. Accordingly, an aspect of the present invention is to provide a data forwarding apparatus and method for reducing a HandOver (HO) interruption time in a wireless communication system where a macro cell and a femto cell coexist.

Another aspect of the present invention is to provide an apparatus and method for, when a macro Base Station (BS) transmits data packets existing in a queue to a Mobile Station (MS), reducing a HO interruption time by removing a latency caused by an Internet Service Provider (ISP) network, in case where the MS performs a HO from a macro cell to a femto cell in a wireless communication system where the macro cell and the femto cell coexist.

A further aspect of the present invention is to provide an apparatus and method for, when a macro BS transmits data packets existing in a queue to an MS, transmitting the data packets directly to the MS through an air link, rather than a wired link through a backbone network (i.e., a core network) and an ISP network, in a case in which the MS performs a HO from a macro cell to a femto cell in a wireless communication system where the macro cell and the femto cell coexist.

Yet another aspect of the present invention is to provide an apparatus and method for, after completing a HO procedure with a femto BS, being again in synchronization with a macro BS and receiving a transmission of data packets existing in a queue through an air link from the macro BS, in case where an MS performs a HO from a macro cell to a femto cell in a wireless communication system where the macro cell and the femto cell coexist.

Still another aspect of the present invention is to provide an apparatus and method for, when a macro BS transmits data packets existing in a queue to an MS, predicting if a data packet transmission through an air link will improve performance and, only in case where performance improvement is possible, determining to transmit the data packet through the air link, in a case in which the MS performs a HO from a macro cell to a femto cell in a wireless communication system where the macro cell and the femto cell coexist.

Still another aspect of the present invention is to provide an apparatus and method for, after completing a HO procedure with a femto BS, alternately being in synchronization with a macro BS and the femto BS and receiving a transmission of data packets existing in a queue through an air link directly from the macro BS while receiving new data packets from the femto BS, in a case in which the MS performs a HO from a macro cell to a femto cell in a wireless communication system where the macro cell and the femto cell coexist.

Still another aspect of the present invention is to provide an apparatus and method for, after completing a HO procedure with a femto BS, sending a macro BS a message requesting the macro BS to transmit data packets existing in a queue, and receiving a transmission of data packets existing in a queue through an air link from the macro BS, in a case in which the MS performs a HO from a macro cell to a femto cell in a wireless communication system where the macro cell and the femto cell coexist.

The above aspects are addressed by providing a data forwarding apparatus and method for reducing a HO interruption time in a wireless communication system.

In accordance with an aspect of the present invention, an operation method of an MS for data forwarding in a wireless communication system is provided. The method includes synchronizing with a serving BS after completing a HO procedure with a target BS, and receiving data packets existing in a queue through an air link directly from the serving BS.

In accordance with another aspect of the present invention, an operation method of an MS for data forwarding in a wireless communication system is provided. The method includes, after completing a HO procedure with a target BS, synchronizing with a serving BS at a previously negotiated serving BS frame start time point, receiving data packets existing in a queue through an air link directly from the serving BS, switching synchronization at a previously negotiated target BS frame start time point and synchronizing with the target BS, and receiving new data packets from the target BS.

In accordance with a further aspect of the present invention, an operation method of an MS for data forwarding in a wireless communication system is provided. The method includes, after completing a HO procedure with a target BS, requesting a serving BS to forward data packets existing in a queue, receiving the data packets existing in the queue through an air link directly from the serving BS, requesting the target BS to transmit new data packets when packets informing of the end of data packet forwarding are received from the serving BS, and receiving new data packets from the target BS.

In accordance with yet another aspect of the present invention, an operation method of a serving BS for data forwarding in a wireless communication system is provided. The method includes determining the use or non-use of an air link for forwarding of data packets of an MS existing in a queue, when determining the use of the air link for the forwarding of the data packets, synchronizing with the MS at a time point at which the MS completes a HO procedure with a target BS, and forwarding the data packets existing in the queue directly to the MS through the air link.

In accordance with still another aspect of the present invention, a wireless communication system for data forwarding is provided. The system includes an MS and a serving BS. The MS is in synchronization with the serving BS after completing a HO procedure with a target BS. At a time point at which the MS completes the HO procedure with the target BS, the serving BS is in synchronization with the MS, and forwards data packets existing in a queue directly to the MS through an air link.

In accordance with still another aspect of the present invention, a wireless communication system for data forwarding is provided. The system includes an MS, a serving BS, and a target BS. After completing a HO procedure with the target BS, the MS is in synchronization with the serving BS at a previously negotiated serving BS frame start time point, receives forwarding of data packets existing in a queue through an air link directly from the serving BS, switches synchronization at a previously negotiated target BS frame start time point, is in synchronization with the target BS, and receives new data packets from the target BS. In an exemplary embodiment, the serving BS is in synchronization with the MS at the previously negotiated serving BS frame start time point, and forwards the data packets existing in the queue directly to the MS through the air link. The target BS is in synchronization with the MS at the previously negotiated target BS frame start time point, and transmits new data packets to the MS.

In accordance with still another aspect of the present invention, a wireless communication system for data forwarding is provided. The system includes an MS, a serving BS, and a target BS. After completing a HO procedure with the target BS, the MS sends the serving BS a message requesting the serving BS to forward data packets existing in a queue and receives the data packets existing in the queue through an air link directly from the serving BS, and, when packets informing of the end of the data packet forwarding are received from the serving BS, sends the target BS a message requesting the target BS to transmit new data packets and receives new data packets from the target BS. In an exemplary embodiment, when the message requesting the serving BS to forward the data packets existing in the queue is received from the MS, the serving BS forwards the data packets existing in the queue directly to the MS through the air link. When the message requesting the target BS to transmit the new data packets is received from the MS, the target BS transmits new data packets to the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
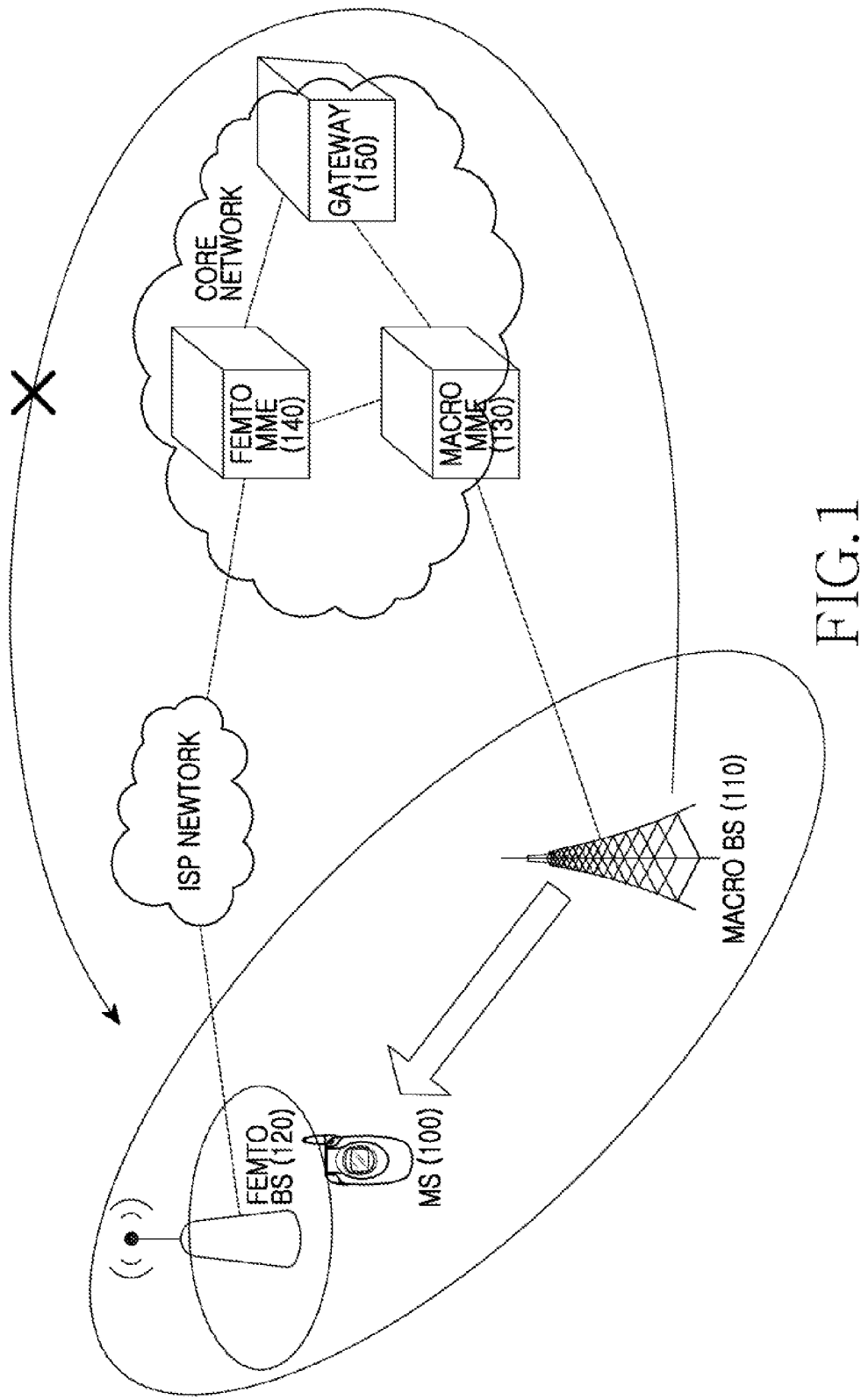
FIG. 1 is a diagram illustrating a wireless communication system in which a macro cell and a femto cell coexist according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The following description is made for an apparatus and method for, when a macro Base Station (BS) transmits data packets existing in a queue to a Mobile Station (MS), transmitting the data packets directly to the MS through an air link, not through a wired link going through a backbone network (i.e., a core network) and an Internet Service Provider (ISP) network, in a case in which the MS performs a HandOver (HO) from a macro cell to a femto cell in a wireless communication system in which the macro cell and the femto cell coexist. More particularly, the following description is made for a way in which, after completing a HO procedure with a femto BS, the MS is again in synchronization with the macro BS and receives a transmission of data packets existing in a queue through the air link from the macro BS. Also, a description is made for an exemplary method in which the macro BS predicts if the data packet transmission through the air link will improve performance and, only in a case in which performance improvement is possible, determines to transmit the data packet through the air link.

In an exemplary wireless communication system in which a macro cell and a femto cell coexist, because the femto cell exists within a service coverage area of the macro cell, it frequently occurs that a receive signal level of a macro BS is higher, even in a place where a HO from the macro cell to the femto cell is achieved. Thus, in a case in which an air link with the macro BS is valid, compared to transmitting through a wired link, it may be more advantageous that the macro BS transmits data packets existing in a queue through the air link, because of a characteristic of the femto cell environment, i.e., a characteristic in which the receive signal level of the macro BS is higher within the femto cell.

Thus, according to exemplary embodiments of the present invention, in a case in which an MS performs a HO from a macro cell to a femto cell in a wireless communication system where the macro cell and the femto cell coexist, the MS may receive a transmission of data packets existing in a queue through an air link directly from a macro BS.

A data transmission through an air link according to an exemplary embodiment the present invention is fulfilled twice. That is, a primary data transmission through the air link is fulfilled soon after an MS receives a HO command message from a macro BS. Up to just before the MS performs a HO procedure with a femto BS, the primary data transmission is fulfilled during a constant time or until the macro BS exhausts all of the data packets in its possession. And, a secondary data transmission through the air link is fulfilled after the MS is again in synchronization with the macro BS after finishing the HO procedure with the femto BS and sends a HO end indication message to the macro BS. The secondary data transmission is fulfilled until a data path establishment in a wired network is finished and the macro BS exhausts all of the data packets in its possession. Here, after the data path establishment is finished, no data packets are transmitted from the macro BS. If the data packet transmission to the MS is completed, the macro BS informs the MS of the end of the data transmission through the air link, through end packets. At this time, the MS is again in synchronization with the femto BS and continues receiving a service from the femto BS.

In the following description of exemplary embodiments of the invention, the wireless communication system uses an Orthogonal Frequency Division Multiplexing (OFDM) or an Orthogonal Frequency Division Multiple Access (OFDMA) scheme. That is, a broadband wireless access communication system using a multi-carrier is described, for example, but the present invention is also identically applicable to other wireless communication systems in which a compact BS (i.e., a femto BS) is installed. Also, a 3rd Generation Partnership Project Long Term Evolution (3GPP LTE) system is described herein as an example, but the present invention is equally applicable to an Institute Electrical and Electronics Engineers (IEEE) 802.16m system. Also, a HO between a macro cell and a femto cell is described herein as an example, but the present invention is equally applicable to a HO between different Radio Access Technologies (RATs) (i.e., an inter-RAT HO), e.g., a HO from Wideband Code Division Multiple Access (WCDMA) to wireless Local Area Network (LAN).

FIG. 1 is a diagram illustrating a wireless communication system in which a macro cell and a femto cell coexist according to an exemplary embodiment of the present invention.

Referring to FIG. 1, the wireless communication system includes an MS 100, a macro BS 110, a femto BS 120, a macro Mobility Management Entity (MME) 130, a femto MME 140, and a gateway 150. Here, it is assumed that the femto BS 120 is hierarchically subordinate to the macro BS 110.

In a case in which the MS 100 performs a HO from a macro cell to a femto cell in a wireless communication system in which the macro cell and the femto cell coexist, as described above, soon after completing a HO procedure with the femto BS 120 according to a command of the macro BS 110, the MS 100 is again in synchronization with the macro BS 110 and receives a transmission of data packets existing in a queue through an air link from the macro BS 110. After that, if receiving all of the transmission of the data packets through the air link, the MS 100 is again in synchronization with the femto BS 120 and continues receiving service from the femto BS 120. Also, just before performing the HO procedure, the MS 100 may receive a transmission of data packets through the air link from the macro BS 110. For this purpose, the MS 100 stores synchronization information of the macro BS 110 and the femto BS 120.

In a case in which the MS 100 intends to perform a HO to a femto cell, the macro BS 110 determines whether to transmit data packets through the air link. For example, the macro BS 110 may predict if the data packet transmission through the air link will improve performance and, in a case in which performance improvement is possible, the macro BS 110 may determine to transmit the data packets through the air link. If the macro BS 110 determines to transmit the data packet through the air link, the macro BS 110 commands the MS 100 to receive a transmission of data packets through the air link. And, the macro BS 110 transmits data packets existing in a queue to the MS 100 through the air link if the MS 100 is again in synchronization with the macro BS 110 soon after completing a HO procedure with the femto BS 120. Also, just before the MS 100 performs the HO procedure with the femto BS 120, the macro BS 110 may transmit data packets to the MS 100 through the air link.

The femto BS 120 recognizes an operation of the MS 100 of receiving a transmission of data packets through the air link from the macro BS 110 soon after completing the HO procedure with the femto BS 120. And, the femto BS 120 transmits new data packets to the MS 100 if the MS 100 is again in synchronization with the femto BS 120 after receiving all data packets from the macro BS 110.

The macro MME 130 communicates with the macro BS 110, and manages the mobility of the MS 100 in an area greater than that covered by the macro BS 110 service area.

The femto MME 140 communicates with the femto BS 120 via an ISP network, and manages the mobility of the MS 100 in an area greater than that covered by the femto BS 120.

The gateway 150 manages and controls the macro MME 130 and the femto MME 140. More particularly, according to HO performance of the MS 100, the gateway 150 switches a data path for the MS 100 and changes a BS and an MME for packet transmission/reception with the MS 100.

In an exemplary implementation, the macro MME 130 and the femto MME 140 may be realized as one MME. In this case, the gateway 150 is dispensable.

Figure 2:
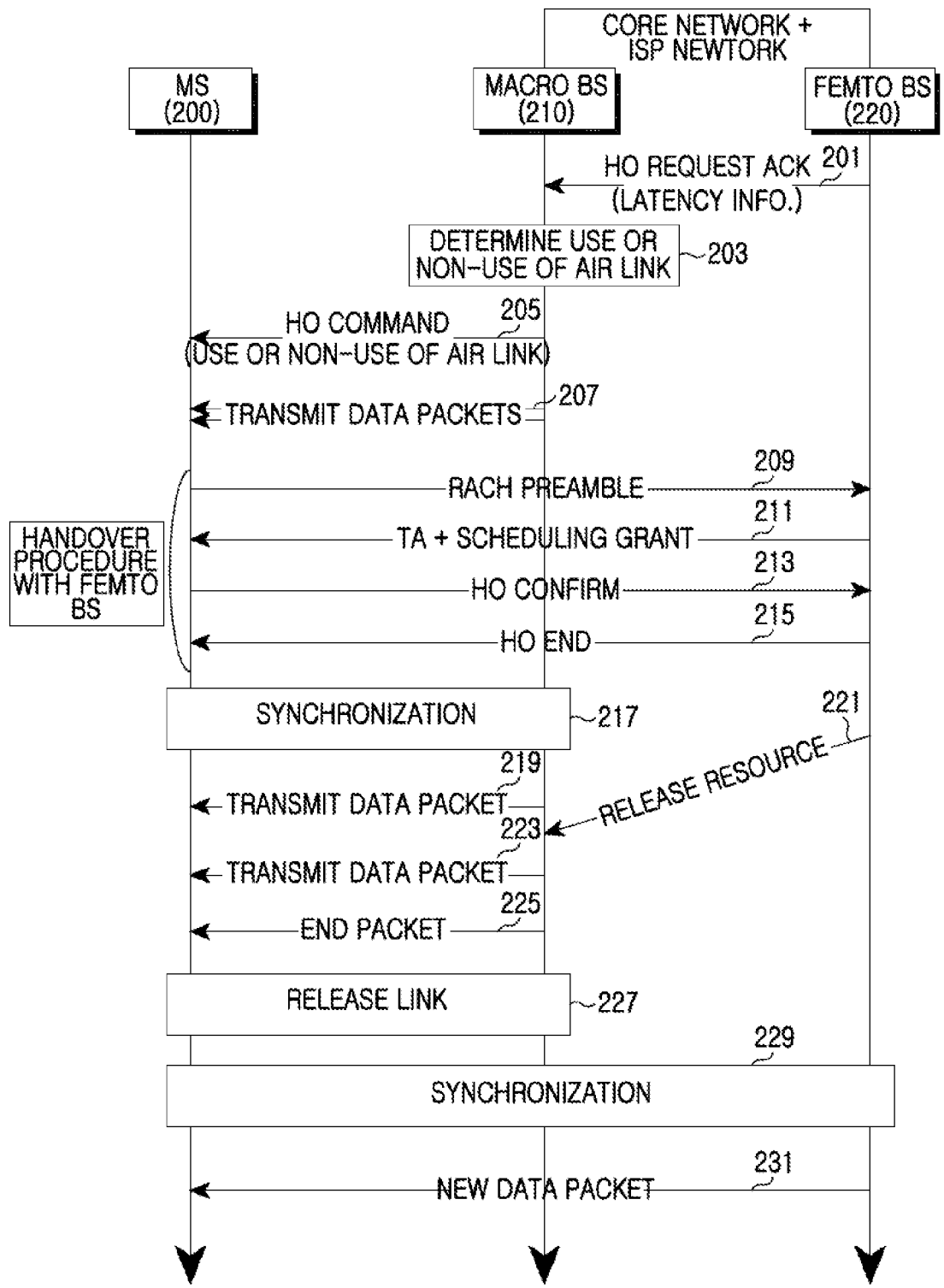
FIG. 2 is a ladder diagram illustrating an operation for transmitting data packets directly to an MS through an air link according to an exemplary embodiment of the present invention.

FIG. 2 is a ladder diagram illustrating an operation for transmitting data packets directly to an MS through an air link according to an exemplary embodiment of the present invention.

Referring to FIG. 2, according to reception of a HO request message from a macro BS 210 through a backbone network (i.e., a core network) and an ISP network, a femto BS 220 determines an acceptance or rejection of the HO request. If determining to accept the HO request, in step 201, the femto BS 220 may send a HO request ACKnowledgement (ACK) message to a macro BS 210. Alternatively, if determining to reject the HO request, the femto BS 220 may send a HO request Non-ACKnowledgement (NACK) message to the macro BS 210.

In a case in which the femto BS 220 sends the HO request ACK message to the macro BS 210, the macro BS 210 determines whether to transmit data packets existing in a queue to the MS 200 through a wired link or through an air link in step 203. At this time, the macro BS 210 may predict if the data packet transmission through the air link will improve performance and, in a case in which it is judged that performance improvement is possible, the macro BS 210 may determine to transmit the data packets through the air link. Here, a criterion for determining the data packet transmission or non-transmission through the air link may be variously set. In one exemplary implementation, for the MS 200 to receive data packets through the air link directly from the macro BS 210 requires a good state of the air link and thus, in a case in which a receive signal level from the MS 200 is equal to or is greater than a predetermined level, the macro BS 210 may determine to transmit data through the air link. Otherwise, the macro BS 210 may determine to transmit data through the wired link. In another exemplary implementation, in a case in which latency resulting from the data transmission through the wired link is equal to or is greater than a predetermined level, the macro BS 210 may determine to transmit the data through the air link. Otherwise, the macro BS 210 may determine to transmit the data through the wired link. Here, the latency resulting from the data transmission through the wired link may be determined as a Round Trip Time (RTT). The RTT is determined using a time at which the macro BS 210 sends a message to the femto BS 220 and a time at which the femto BS 220 receives the message from the macro BS 210. For this purpose, the femto BS 220 may include latency information (e.g., a period of time for which the femto BS 220 receives the HO request message from the macro BS 210) in the HO request ACK message, and send the HO request ACK message including the latency information to the macro BS 210. In addition, the macro BS 210 may determine the data transmission or non-transmission through the air link by way of various indicators such as traffic loading, etc.

In step 205, the macro BS 210 sends the MS 200 a HO command message including information on the use or non-use of an air link, and commands the MS 200 to receive data packets transmitted through the wired link or the air link. In step 207, according to the determination, the macro BS 210 transmits the data packets to the MS 200 through the wired link, or transmits the data packets to the MS 200 through the air link. Here, the data packet transmission process through the air link is a primary data packet transmission process through an air link according to an exemplary embodiment of the present invention. Up to just before the MS 200 performs a HO procedure with the femto BS 220, the data packet transmission process through the air link is fulfilled during a constant time or until the macro BS 210 exhausts all of the data packets in its possession designated for the MS 200.

After receiving the primary data packets through the air link from the macro BS 210, the MS 200 performs the HO procedure with the femto BS 220. That is, in step 209, the MS 200 transmits a Random Access CHannel (RACH) preamble signal as a reference signal for UpLink (UL) synchronization, to the femto BS 220. In step 211, the femto BS 220 transmits a response to the received RACH preamble signal to the MS 200 such that the MS 200 may keep transmitting data intended for transmission. Here, the message that the femto BS 220 sends in response to the received RACH preamble signal is referred to as a 'scheduling grant message'. Also, the femto BS 220 determines a timing offset on the basis of the received RACH preamble signal, and sends the MS 200 a Timing Advanced (TA) message, which includes timing offset information for UL synchronization, and the scheduling grant message. Upon receiving the TA message and the scheduling grant message, in step 213, the MS 200 is in synchronization with the femto BS 220 using the timing offset information within the TA message, and sends a HO confirm message to the femto BS 220. Upon receiving the HO confirm message, in step 215, the femto BS 220 sends a HO end message to the MS 200, thereby completing the HO procedure with the MS 200.

Figure 4:
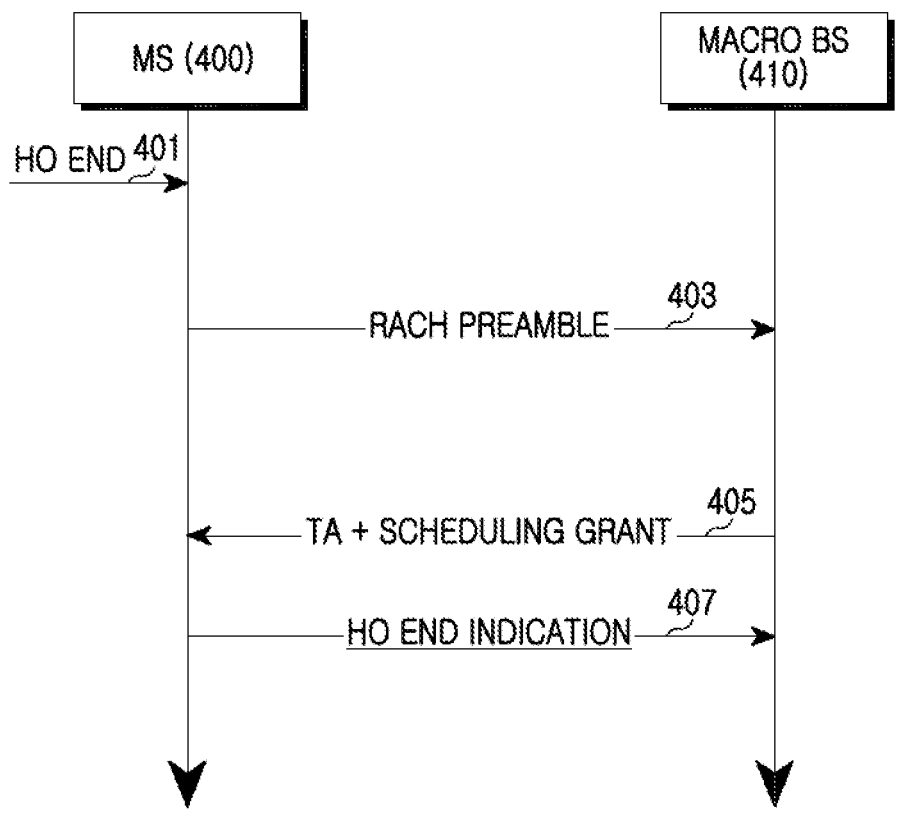
FIG. 4 is a ladder diagram illustrating an operation for, when a macro BS transmits data packets existing in a queue to an MS, being in synchronization with the MS in order to transmit the data packets directly to the MS through an air link according to an exemplary embodiment of the present invention.

After completing the HO procedure with the femto BS 220, in step 217, the MS 200 is again in synchronization with the macro BS 210 to receive secondary data packets from the macro BS 210 through the air link. Here, the MS 200 may be in synchronization with the macro BS 210 using synchronization information from when the MS 200 was previously in synchronization with the macro BS 210, before performing the HO procedure with the femto BS 220. For this purpose, the MS 200 must be able to store the synchronization information. By performing the synchronization using the stored synchronization information, the MS 200 may reduce a time consumed for synchronization. In another exemplary embodiment, a procedure as illustrated in FIG. 4 is possible, which will be described in more detail below.

Upon being again in synchronization with the MS 200, in steps 219 and 223, the macro BS 210 transmits data packets existing in a queue to the MS 200 through the air link. Here, the data packet transmission process is a secondary data packet transmission process through the air link, and is fulfilled until a data path establishment in a wired network is finished and the macro BS 210 exhausts all the data packets in its possession that are designated for the MS 200. After that, the macro BS 210 completes all of the data packet transmission to the MS 200 and, in step 225, the macro BS 210 informs the MS 200 of the end of the data transmission through the air link through end packets. In step 227, the macro BS 210 releases the air link with the MS 200. Also, in step 221, according to the HO, the macro BS 210 receives a resource release message from the femto BS 220 through the backbone network (i.e., the core network) and the ISP network. At this time, the macro BS 210 releases resources allocated to the MS 200.

In step 229, the MS 200 receiving the end packets from the macro BS 210 is again in synchronization with the femto BS 220 and, in step 231, the MS 200 receives new data packets from the femto BS 220. Here, the MS 200 is in synchronization with the femto BS 220 using synchronization information from when the MS 200 previously performed the HO procedure with the femto BS 220. For this purpose, the MS 200 must be able to store the synchronization information. By performing the synchronization using the stored synchronization information, the MS 200 may reduce a time consumed for synchronization.

On the other hand, according to an exemplary implementation, a time point of finishing a data transmission through an air link is basically a time when a previous BS (i.e., a macro BS) transmits all data packets in its possession to an MS. In another exemplary implementation, through a negotiation with the MS or a femto BS, the macro BS may previously negotiate a time of the data transmission through the air link and, only during the negotiated time, perform the data transmission through the air link. In an exemplary embodiment, a time of a primary data transmission through an air link may be negotiated by allowing the macro BS to inform the MS of the time of the primary data transmission through the air link by way of a HO command message. In another exemplary embodiment, a time of a secondary data transmission through the air link may be negotiated by allowing the macro BS to inform the MS of the time of the secondary data transmission through the air link by way of a HO command message and allowing the MS to inform the femto BS of this by way of a HO confirm message in a HO procedure performance process.

On the other hand, in an exemplary embodiment of the present invention, a 3GPP LTE system is described, for example. Unlike this, in an IEEE 802.16m system, a HO procedure between an MS and a femto BS includes a ranging procedure, a re-authentication procedure, and a re-registration procedure.

Here, a more detailed operation of FIG. 2 is described below with reference to FIG. 3.

Figure 3:
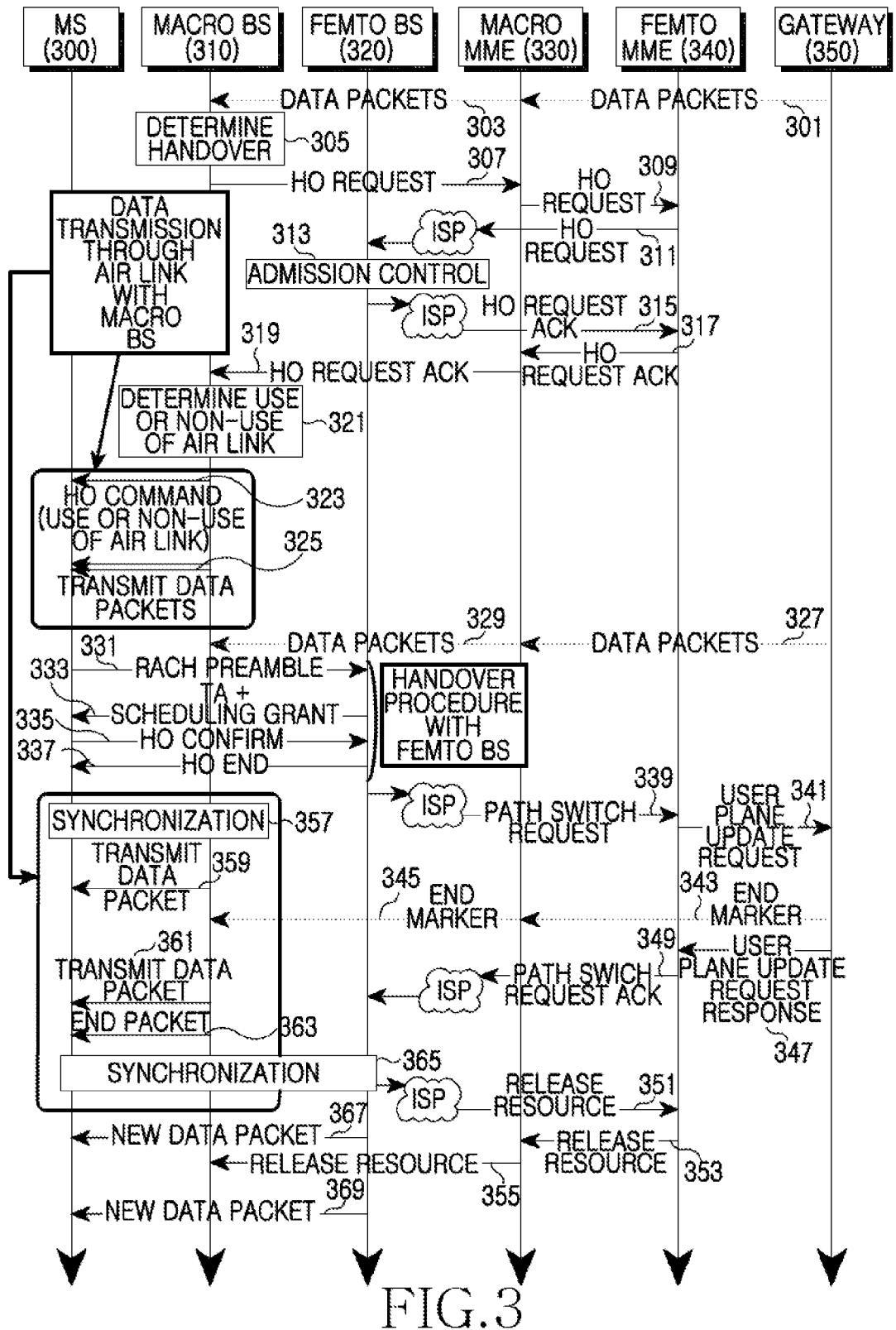
FIG. 3 is a ladder diagram illustrating an operation for transmitting data packets directly to an MS through an air link, in a case in which the MS performs a HO from a macro cell to a femto cell according to an exemplary embodiment of the present invention.

FIG. 3 is a ladder diagram illustrating an operation for transmitting data packets directly to an MS through an air link, in a case in which the MS performs a HO from a macro cell to a femto cell according to an exemplary embodiment of the present invention.

Referring to FIG. 3, in step 301, a gateway 350 transmits data packets targeting the MS 300, to a macro MME 330 managing a macro BS 310, in order to transmit the data packets to the macro BS 310 currently providing a service to an MS 300. In step 303, the macro MME 330 transmits the data packets to the macro BS 310.

The macro BS 310 transmits the data packets to the MS 300. According to a HO request of the MS 300 or in a case in which the macro BS 310 determines that there is a need for a HO of the MS 300 to a femto BS 320, in step 305, the macro BS 310 determines the HO of the MS 300 and, in step 307, the macro BS 310 sends a HO request message to the macro MME 330. At this time, the macro BS 310 no longer transmits data packets for the MS 300, which are received from the macro MME 330, to the MS 300, and stores the received data packets in a queue. In step 309, the macro MME 330 sends the HO request message from the macro BS 310, to a femto MME 340 managing the femto BS 320. In step 311, the femto MME 340 sends the HO request message to the femto BS 320 via an ISP network.

Upon receiving the HO request message, in step 313, the femto BS 320 performs an admission control function and determines an acceptance or rejection of the HO request. If determining acceptance of the HO request, in step 315, the femto BS 320 may send a HO request ACK message to the femto MME 340 via the ISP network. Alternatively, if determining rejection of the HO request, the femto BS 320 may send a HO request NACK message to the femto MME 340. In step 317, the femto MME 340 sends the macro MME 330 the HO request ACK message or HO request NACK message received from the femto BS 320. In step 319, the macro MME 330 sends the HO request ACK message or HO request NACK message to the macro BS 310.

In a case in which the HO request ACK message is received from the macro MME 330, in step 321, the macro BS 310 determines whether to transmit data packets existing in a queue to the MS 300 through a wired link or through the air link. At this time, the macro BS 310 may predict if the data packet transmission through the air link will improve performance and, in a case in which it is determined that a performance improvement is possible, the macro BS 310 may determine to transmit the data packet through the air link. Here, a criterion of determining whether to transmit the data packet through the air link may be variously set. In one exemplary implementation, for the MS 300 to receive data packets through the air link directly from the macro BS 310 requires a good state of the air link and thus, in a case in which a receive signal level from the MS 300 is equal to or is greater than a predetermined level, the macro BS 310 may determine to transmit data through the air link. Otherwise, the macro BS 310 may determine to transmit data through the wired link. In another exemplary implementation, in a case in which latency resulting from the data transmission through the wired link is equal to or is greater than a predetermined level, the macro BS 310 may determine to transmit the data through the air link. Otherwise, the macro BS 310 may determine to transmit the data through the wired link. In addition, the macro BS 310 may determine whether to transmit the data through the air link by way of various indicators such as traffic loading, etc.

In step 323, the macro BS 310 sends the MS 300 a HO command message including information on the use or non-use of an air link, and commands the MS 300 to receive data packets transmitted through the wired link or the air link. In step 325, according to the determination, the macro BS 310 transmits the data packets stored in a queue to the MS 300 through the wired link, or transmits the data packets stored in the queue to the MS 300 through the air link. In an exemplary implementation, the data packet transmission process through the air link is a primary data packet transmit process through an air link. Up to just before the MS 300 performs a HO procedure with the femto BS 320, the data packet transmission process through the air link is fulfilled during a constant time or until the macro BS 310 exhausts all of its possessing data packets.

On the other hand, because it is before a HO procedure is performed between the MS 300 and the femto BS 320, in step 327, the gateway 350 continues transmitting data packets targeting the MS 300, to the macro MME 330 and also, in step 329, the macro MME 330 transmits the data packets to the macro BS 310. At this time, the macro BS 310 stores, in the queue, the data packets received from the macro MME 330.

After receiving the primary data packets through the air link from the macro BS 310, the MS 300 performs the HO procedure with the femto BS 320. That is, in step 331, the MS 300 transmits an RACH preamble signal as a reference signal for UL synchronization, to the femto BS 320. In step 333, the femto BS 320 transmits a scheduling grant message as a response to the received RACH preamble signal, to the MS 300 such that the MS 300 may continue transmitting data intended for transmission. Also, the femto BS 320 determines a timing offset on the basis of the received RACH preamble signal, and sends the MS 300 a TA message, which includes timing offset information for UL synchronization, and the scheduling grant message. Upon receiving the TA message and the scheduling grant message, in step 335, the MS 300 is in synchronization with the femto BS 320 using the timing offset information within the TA message, and sends a HO confirm message to the femto BS 320. Upon receiving the HO confirm message, in step 337, the femto BS 320 sends a HO end message to the MS 300, thereby completing the HO procedure with the MS 300.

Upon completing the HO procedure with the MS 300, in step 339, the femto BS 320 sends a path switch request message to the femto MME 340 through the ISP network to request the femto MME 340 to switch a data path for the MS 300. That is, the femto BS 320 sends the femto MME 340 a request for changing a BS and MME for packet transmission/reception with the MS 300 into the femto BS 320 and the femto MME 340. Upon receiving the path switch request message, in step 341 the femto MME 340 sends the gateway 350 a user plane update request message to request the gateway 350 to update a user plane. The user plane represents a path along which data packets of the MS 300 move.

Upon receiving the user plane update request message, in step 343, according to the request, the gateway 350 updates the user plane, includes end marker information in the data packets targeting the MS 300, and transmits the data packets including the end marker information to the macro MME 330. In step 345, the macro MME 330 transmits the data packets including the end marker information to the macro BS 310. The macro BS 310 waits for reception of the data packets including the end marker information, receives up to the data packets including the end marker information from the macro MME 330, and stores the received data packets in the queue. Also, in step 347, the gateway 350 sends the femto MME 340 a user plane update request response message. Upon receiving the user plane update request response message, in step 349, the femto MME 340 sends a path switch request ACK message to the femto BS 320 via the ISP network.

Upon receiving the path switch request ACK message, in step 351, the femto BS 320 sends a resource release message to the femto MME 340 via the ISP network. In step 353, the femto MME 340 sends the resource release message to the macro MME 330. In step 355, the macro MME 330 sends the resource release message to the macro BS 310. Upon receiving the resource release message, the macro BS 310 releases resources allocated to the MS 300.

On the other hand, after completing the HO procedure with the femto BS 320, in step 357, the MS 300 is again in synchronization with the macro BS 310 to receive secondary data packets from the macro BS 310 through the air link. Here, the MS 300 may be in synchronization with the macro BS 310 using synchronization information from when the MS 300 was previously in synchronization with the macro BS 310 before performing the HO procedure with the femto BS 320. For this purpose, the MS 300 must be able to store the synchronization information. By performing the synchronization using the stored synchronization information, the MS 300 may reduce a time consumed for synchronization. In another exemplary embodiment, a procedure as illustrated in FIG. 4 is possible, which will be described in more detail below.

Upon being again in synchronization with the MS 300, in steps 359 and 361, the macro BS 310 transmits data packets existing in a queue to the MS 300 through the air link. Here, the data packet transmission process is a secondary data packet transmission process through the air link, and is fulfilled until a data path establishment in a wired network is finished or the macro BS 310 exhausts all data packets designated for the MS 300 in its possession. After that, the macro BS 310 completes all of the data packet transmission to the MS 300 and, in step 363, the macro BS 310 informs the MS 300 of the end of the data transmission through the air link, through end packets. Then, the macro BS 310 releases the air link with the MS 300.

Upon receiving the end packets from the macro BS 310, in step 365, the MS 300 is again in synchronization with the femto BS 320 and, in steps 367 and 369, the MS 300 receives new data packets from the femto BS 320. Here, the MS 300 is in synchronization with the femto BS 320 using synchronization information from when the MS 300 previously performs the HO procedure with the femto BS 320. For this purpose, the MS 300 must be able to store the synchronization information. By performing the synchronization using the stored synchronization information, the MS 300 may reduce a time consumed for synchronization.

FIG. 4 is a ladder diagram illustrating an operation for, when a macro BS transmits data packets existing in a queue to an MS, being in synchronization with the MS in order to transmit the data packets directly to the MS through an air link according to an exemplary embodiment of the present invention.

Referring to FIG. 4, in step 401, an MS 400 receives a HO end message from a femto BS and completes a HO procedure with the femto BS. In step 403, the MS 400 transmits an RACH preamble signal as a reference signal for UL synchronization, to a macro BS 410. At this time, in step 405, the macro BS 410 sends the MS 400 a scheduling grant message corresponding to the received RACH preamble signal such that the MS 400 may continue transmitting data intended for transmission. Also, the macro BS 410 determines a timing offset on the basis of the received RACH preamble signal, and sends the MS 400 a TA message, which includes timing offset information for UL synchronization, and the scheduling grant message. Upon receiving the TA and the scheduling grant message, in step 407, the MS 400 is in synchronization with the macro BS 410 using the timing offset information and sends a HO end indication message to the macro BS 410 to inform the macro BS 410 that it is possible to receive data packets through an air link. By doing so, the macro BS 410 may be again in synchronization with the MS 400, and transmit data packets existing in a queue to the MS 400.

On the other hand, it may occur that a data transmission through an air link and information reception from a femto cell should be carried out at the same time. For example, it may occur that an MS should receive broadcasting information from the femto cell while, after performing a HO procedure with a femto BS, the MS is again in synchronization with a macro BS and receives a secondary transmission of data packets from the macro BS through the air link. For this purpose, the MS may be in synchronization with the macro BS or femto BS while alternately switching the macro BS and the femto BS every frame or at a constant frame period, and receive data packets from the macro BS or the femto BS. That is, assuming that an 'M-frame' is a frame at which the MS receives a signal from the macro BS and an 'F-frame' is a frame at which the MS receives a signal from the femto BS, the MS may simultaneously receive signals of the macro BS and the femto BS while alternately switching the M-frame and the F-frame every frame or at a constant frame period. An exemplary operation for the MS to be in synchronization with the macro BS or the femto BS while alternately switching the macro BS and the femto BS every frame or at a constant frame period and receive data packets from the macro BS or the femto BS is later described in more detail with reference to FIG. 5.

Figure 5:
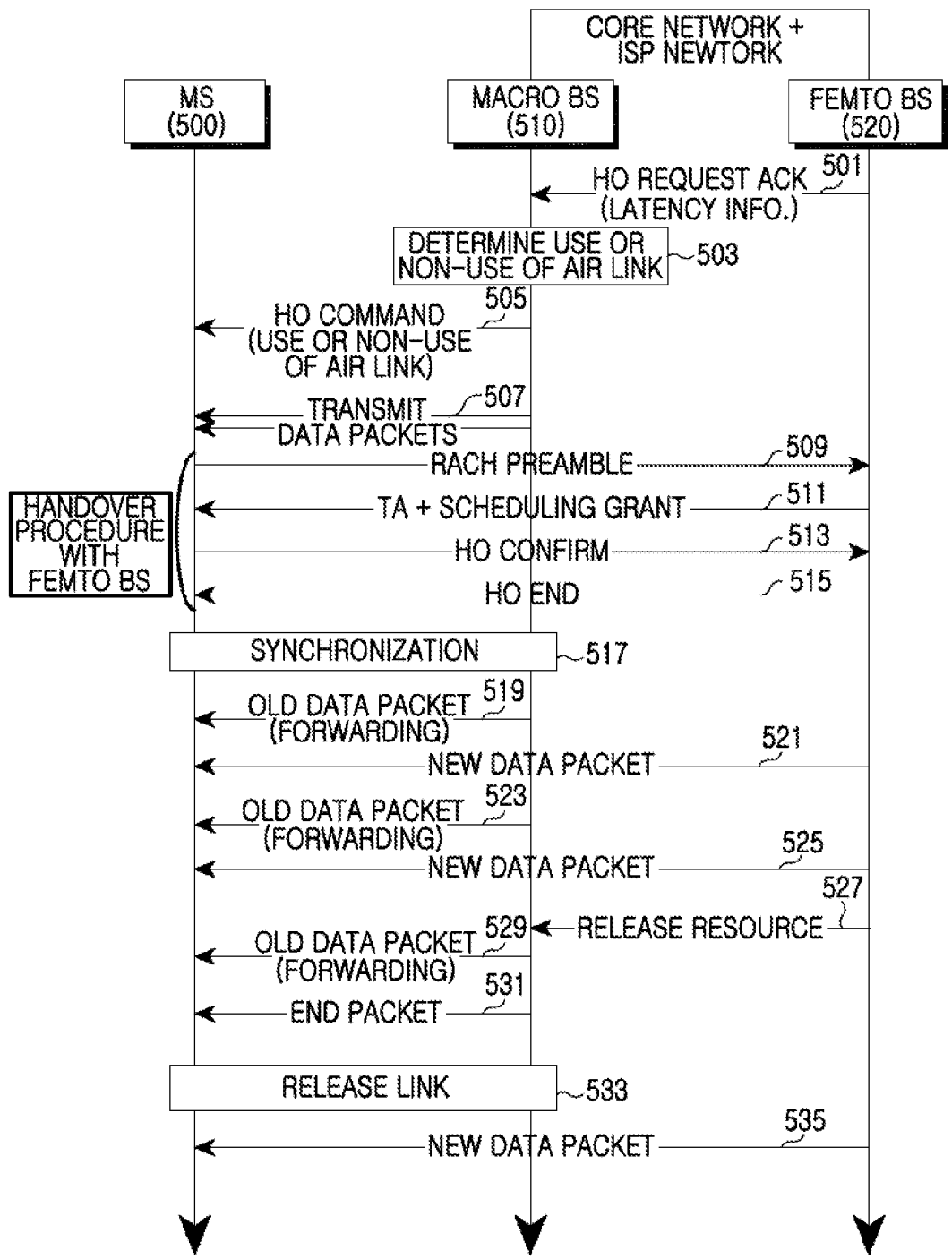
FIG. 5 is a ladder diagram illustrating an operation for transmitting data packets directly to an MS through an air link according to an exemplary embodiment of the present invention.

FIG. 5 is a ladder diagram illustrating an operation for transmitting data packets directly to an MS through an air link according to an exemplary embodiment of the present invention.

Referring to FIG. 5, according to reception of a HO request message from a macro BS 510 through a backbone network (i.e., a core network) and an ISP network, a femto BS 520 determines an acceptance or rejection of the HO request. If determining acceptance of the HO request, in step 501, the femto BS 520 may send a HO request ACK message to the macro BS 510. Alternatively, if determining rejection of the HO request, the femto BS 520 may send a HO request NACK message to the macro BS 510.

In a case in which the femto BS 520 sends the HO request ACK message to the macro BS 510, in step 503, the macro BS 510 determines whether to transmit data packets existing in a queue to the MS 500 through a wired link or through the air link. At this time, the macro BS 510 may predict if the data packet transmission through the air link will improve performance and, in a case in which it is determined that performance improvement is possible, the macro BS 510 may determine to transmit the data packet through the air link. Here, a criterion for determining whether to transmit the data packet through the air link may be variously set. In one exemplary implementation, for the MS 500 to receive data packets through the air link directly from the macro BS 510 requires a good state of the air link and thus, in a case in which a receive signal level from the MS 500 is equal to or is greater than a predetermined level, the macro BS 510 may determine to transmit data through the air link. Otherwise, the macro BS 510 may determine to transmit data through the wired link. In another exemplary implementation, in a case in which latency resulting from the data transmission through the wired link is equal to or is greater than a predetermined level, the macro BS 510 may determine to transmit the data through the air link. Otherwise, the macro BS 510 may determine to transmit the data through the wired link. Here, the latency resulting from the data transmission through the wired link may be determined as an RTT. The RTT is determined using a time at which the macro BS 510 sends a message to the femto BS 520 and a time at which the femto BS 520 receives the message from the macro BS 510. For this purpose, the femto BS 520 may include latency information (e.g., a period of time for which the femto BS 520 receives the HO request message from the macro BS 510) in the HO request ACK message, and send the HO request ACK message including the latency information to the macro BS 510. In addition, the macro BS 510 may determine whether to transmit the data through the air link by way of various indicators such as traffic loading, etc.

In step 505, the macro BS 510 sends the MS 500 a HO command message including information on the use or non-use of an air link, and commands the MS 500 to receive data packets transmitted through the wired link or the air link. Also, the macro BS 510 further includes information on whether to switch an M-frame and an F-frame and information on a time point of a start of the M-frame, in the HO command message, to negotiate a switching synchronization with the MS 500. By this, the macro BS 510 is in switching synchronization with the MS 500. In step 507, according to the determination, the macro BS 510 transmits the data packets to the MS 500 through the wired link, or transmits the data packets to the MS 500 through the air link. Here, the data packet transmission process through the air link is a primary data packet transmission process through an air link. Up to just before the MS 500 performs a HO procedure with the femto BS 520, the data packet transmission process through the air link is fulfilled during a constant time or until the macro BS 510 exhausts data packets designated for the MS 500 in its possession.

After receiving the primary data packets through the air link from the macro BS 510, the MS 500 performs the HO procedure with the femto BS 520. That is, in step 509, the MS 500 transmits an RACH preamble signal as a reference signal for UL synchronization, to the femto BS 520. In step 511, the femto BS 520 transmits a scheduling grant message as a response to the received RACH preamble signal, to the MS 500 such that the MS 500 may continue transmitting data intended for transmission. Also, the femto BS 520 determines a timing offset on the basis of the received RACH preamble signal, and sends the MS 500 a TA message, which includes timing offset information for UL synchronization, and the scheduling grant message. Upon receiving the TA message and the scheduling grant message, in step 513, the MS 500 is in synchronization with the femto BS 520 using the timing offset information within the TA message, and sends a HO confirm message to the femto BS 520. At this time, the MS 500 includes, in the HO confirm message, the information on whether to switch the M-frame and the F-frame and the information on the time point of the start of the M-frame, which are acquired through the HO command message, to inform the femto BS 520 of the switching synchronization negotiated with the macro BS 510. By this, the MS 500 is in switching synchronization with the femto BS 520. Upon receiving the HO confirm message, in step 515, the femto BS 520 sends a HO end message to the MS 500, thereby completing the HO procedure with the MS 500.

After completing the HO procedure with the femto BS 520, in step 517, the MS 500 is again in synchronization with the macro BS 510 to receive secondary data packets from the macro BS 510 through the air link. Here, the MS 500 may be in synchronization with the macro BS 510 using synchronization information from when the MS 500 was previously in synchronization with the macro BS 510 before performing the HO procedure with the femto BS 520. For this purpose, the MS 500 must be able to store the synchronization information. By performing the synchronization using the stored synchronization information, the MS 500 may reduce a time consumed for synchronization. In another implementation, an exemplary embodiment as described with reference to FIG. 4 is possible.

After that, in a case in which the macro BS 510 negotiates the switching of the M-frame and the F-frame with the MS 500 by way of the HO command message, in step 519, the macro BS 510 transmits data packets (hereinafter, referred to as 'old data packets') existing in a queue to the MS 500 through the air link at the M-frame start time point negotiated with the MS 500. Here, the switching of the M-frame and F-frame may be carried out every frame or at a constant frame period. Then, if the switching from the M-frame to the F-frame takes place, that is, at a constant frame or at a next frame after the M-frame start time point, the MS 500 is again in synchronization with the femto BS 520. At this time, in step 521, the femto BS 520 transmits new data packets to the MS 500. Here, the data packet transmission process through the air link is a secondary data packet transmission process through the air link, and has to be fulfilled until a data path establishment in a wired network is finished and the macro BS 510 exhausts all data packets designated for the MS 500 in its possession. Thus, in steps 523, 525, and 529, until the macro BS 510 exhausts all data packets in its possession, the MS 500 repeatedly performs a process of, by way of switching of an M-frame and an F-frame, being in synchronization with the macro BS 510 at the M-frame and receiving old data packets from the macro BS 510, and being again in synchronization with the femto BS 520 at the F-frame and receiving new data packets from the femto BS 520. Here, the MS 500 may be in synchronization with the macro BS 510 using synchronization information from when the MS 500 was previously in synchronization with the macro BS 510 before performing the HO procedure with the femto BS 520, and may be in synchronization with the femto BS 520 using synchronization information, which is acquired in a HO procedure performance process with the femto BS 520. By this, if the data packet transmission to the MS 500 is completed, in step 531, the macro BS 510 informs the MS 500 of the end of the data transmission through the air link, through end packets and, in step 533, the macro BS 510 releases the air link with the MS 500. Also, in step 527, according to the HO, the macro BS 510 receives a resource release message from the femto BS 520 through the backbone network (i.e., the core network) and the ISP network. At this time, the macro BS 510 releases resources allocated to the MS 500. Then, the MS 500 receiving the end packets from the macro BS 510 is again in synchronization with the femto BS 520 and, in step 535, the MS 500 receives new data packets from the femto BS 520.

On the other hand, in a case in which the exemplary embodiment of FIG. 5 is applied to an asynchronous system, the asynchronous system may have a problem when an MS is in synchronization with a macro BS or a femto BS while alternately switching the macro BS and the femto BS. In a system in which BSs are out of synchronization such as the asynchronous system, a BS of a frame of an early start time point and a BS of a frame of a late start time point coexist. In this case, it may occur that, if an MS intends to be out of synchronization with the BS of the frame of the late start time point and be in synchronization with the BS of the frame of the early start time point, synchronization is impossible because the start time point of the frame of the BS which the MS intends to be in synchronization with is an already lapsed time point.

Figure 6:
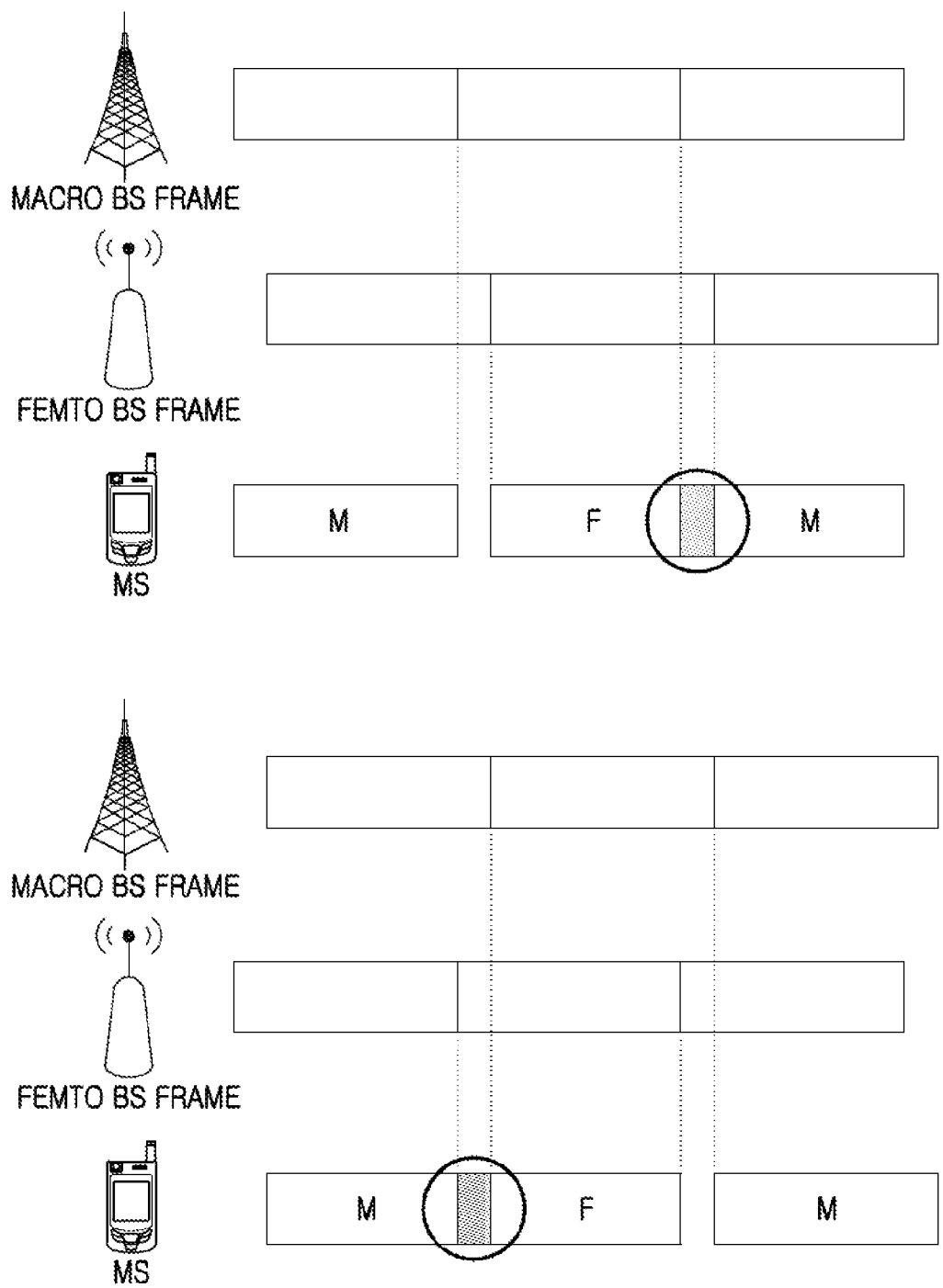
FIG. 6 is a diagram illustrating a frame synchronization according to an exemplary embodiment of the present invention.
Figure 7:
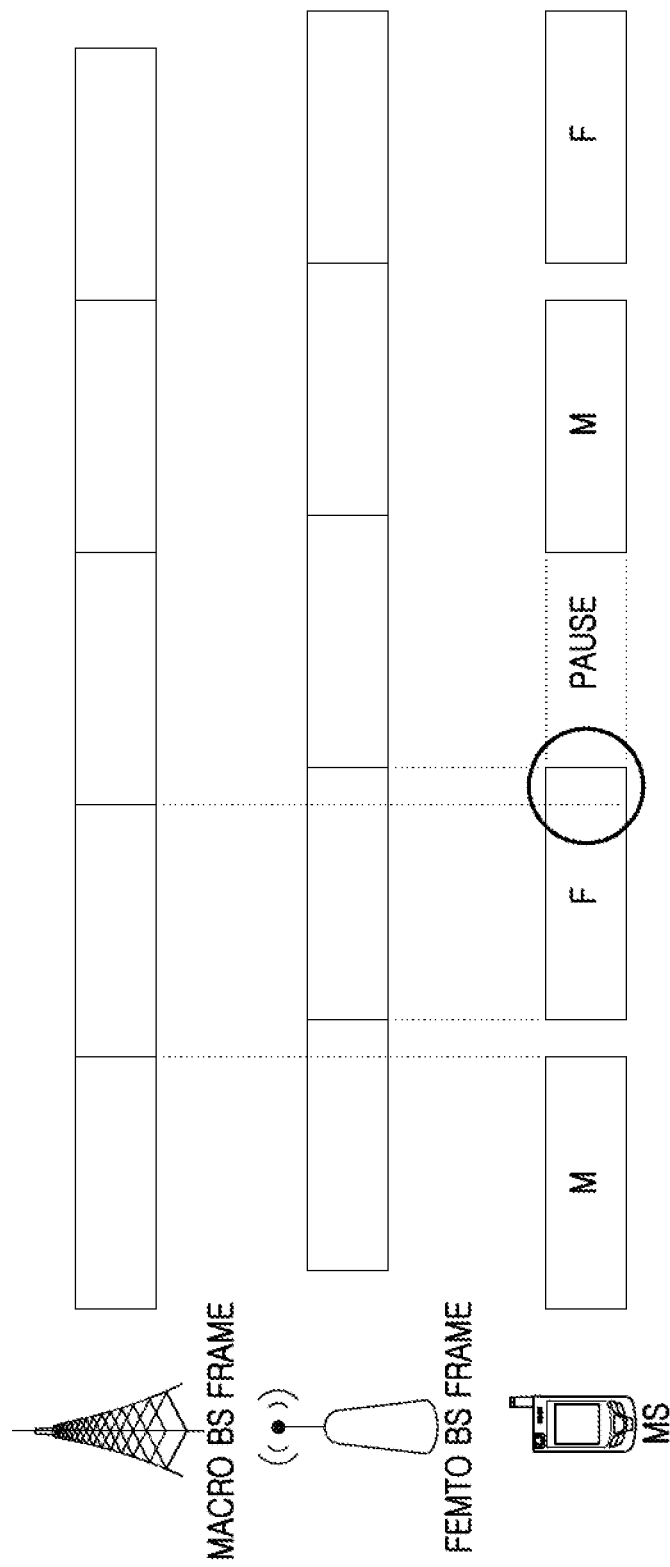
FIG. 7 is a diagram illustrating a scheme of inserting a pause frame according to an exemplary embodiment of the present invention.
Figure 8:
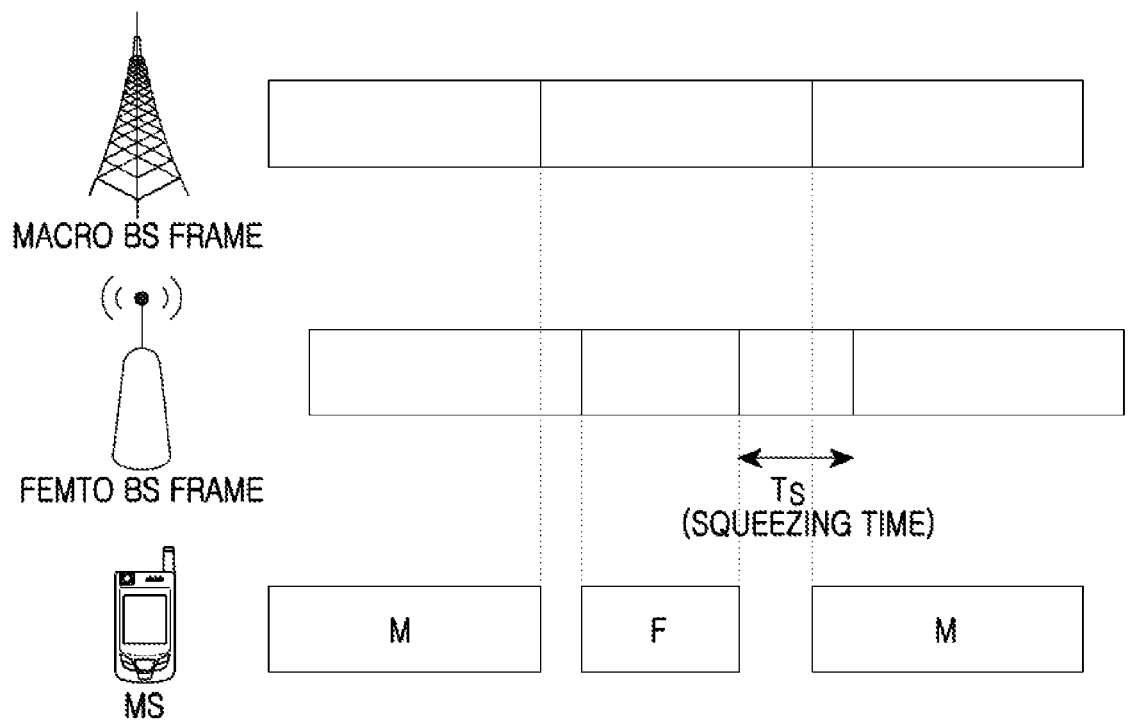
FIG. 8 is a diagram illustrating a scheme of reducing a length of a frame according to an exemplary embodiment of the present invention.

FIG. 6 is a diagram illustrating a frame synchronization according to an exemplary embodiment of the present invention. FIG. 7 is a diagram illustrating a scheme of inserting a pause frame according to an exemplary embodiment of the present invention. FIG. 8 is a diagram illustrating a scheme of reducing a length of a frame according to an exemplary embodiment of the present invention.

Referring to FIG. 6, in a case in which a start time point of an M-frame is earlier than a start time point of an F-frame, when an MS switches synchronization from the F-frame to the M-frame, the synchronization may be impossible because the start time point of the M-frame is an already lapsed time point. Or, in a case in which the start time point of the F-frame is earlier than the start time point of the M-frame, when the MS switches synchronization from the M-frame to the F-frame, the synchronization may be impossible because the start time point of the F-frame is an already lapsed time point. According to exemplary embodiments of the present invention, frame synchronization may be carried out as described below:

In a first exemplary method, when an MS switches synchronization from a frame of a late start time point to a frame of an early start time point, pause frame is inserted and synchronization begins at a next frame.

Referring to FIG. 7, in a case in which a start time point of an M-frame is earlier than a start time point of an F-frame, when an MS switches synchronization from the F-frame to the M-frame, the MS inserts a pause frame, regards a next frame as the M-frame, and is in synchronization with the M-frame. The pause frame is a duration in which the MS receives no data packet. By inserting the pause frame as above, the synchronization problem may be simply addressed.

In a second exemplary method, when an MS switches synchronization from a frame of a late start time point to a frame of an early start time point, the MS regards a length of the frame of the late start time point as short, stops reception in the middle of the frame, and is then in synchronization with the frame of the early start time point.

Referring to FIG. 8, in a case in which a start time point of an M-frame is earlier than a start time point of an F-frame, when an MS switches synchronization from the F-frame to the M-frame, the MS stops receiving the F-frame at a constant time (i.e., a squeezing time (Ts)) before the end of the F-frame, and is in synchronization with the M-frame. By reducing a length of the F-frame as described above, the MS attempts to be in synchronization with a macro BS earlier than the start time point of the M-frame and thus, may be successfully in synchronization with the macro BS. At this time, the macro BS must allocate resources to a corresponding MS in consideration of the reduced frame length.

On the other hand, an exemplary method for an operation in an asynchronous system is described in the aforementioned two embodiments. In a case of a synchronous system in which BSs are in synchronization with each other or in a case in which BSs have synchronization information of each other, an exemplary method as described in FIG. 9 is possible.

Figure 9:
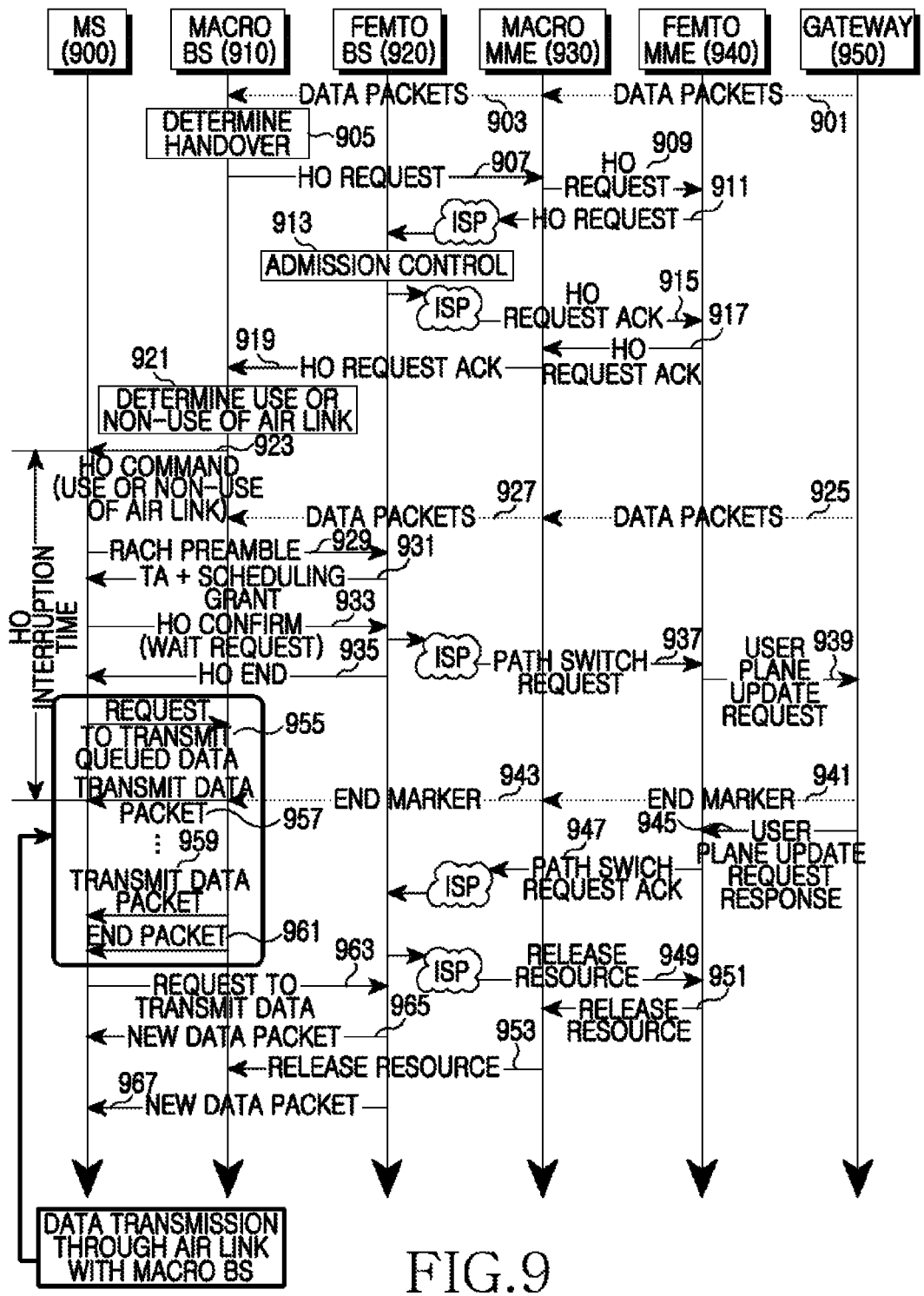
FIG. 9 is a ladder diagram illustrating an operation for transmitting data packets directly to an MS through an air link according to an exemplary embodiment of the present invention.

FIG. 9 is a ladder diagram illustrating an operation for transmitting the data packets directly to the MS through an air link according to an exemplary embodiment of the present invention.

Referring to FIG. 9, an operation is substantially the same as that described above with reference to FIG. 3, but has a difference as follows. First, after sending an MS 900 a HO command message including information on the use or non-use of an air link in step 923, the macro BS 910 does not perform a primary data packet transmission process through an air link, of transmitting data packets stored in a queue to the MS 900 through the air link. Thus, as receiving the HO command message from the macro BS 910, in steps 929, 931, 933, and 935, the MS 900 directly performs a HO procedure with a femto BS 920. In an exemplary HO procedure, the MS 900 includes wait request information in a HO confirm message sent to the femto BS 920, to request the femto BS 920 to wait for transmission of new data packets until there is subsequently a request for transmission of new data packets. After that, in step 955, the MS 900 completing the HO procedure with the femto BS 920 sends the macro BS 910 a message requesting the macro BS 910 to transmit data packets existing in a queue, in place of performing a synchronization procedure with the macro BS 910. Upon receiving this message, in steps 957 and 959, the macro BS 910 transmits data packets existing in a queue to the MS 900 through the air link. If the data packet transmission to the MS 900 is completed, in step 961, the macro BS 910 informs the MS 900 of the end of the data transmission through the air link, through end packets. Upon receiving the end packets, in step 963, the MS 900 sends the femto BS 920 a message requesting the femto BS 920 to transmit new data packets, in place of again performing a synchronization procedure with the femto BS 920. Upon receiving this message, in steps 965 and 967, the femto BS 920 sends new data packets to the MS 900.

Figure 10:
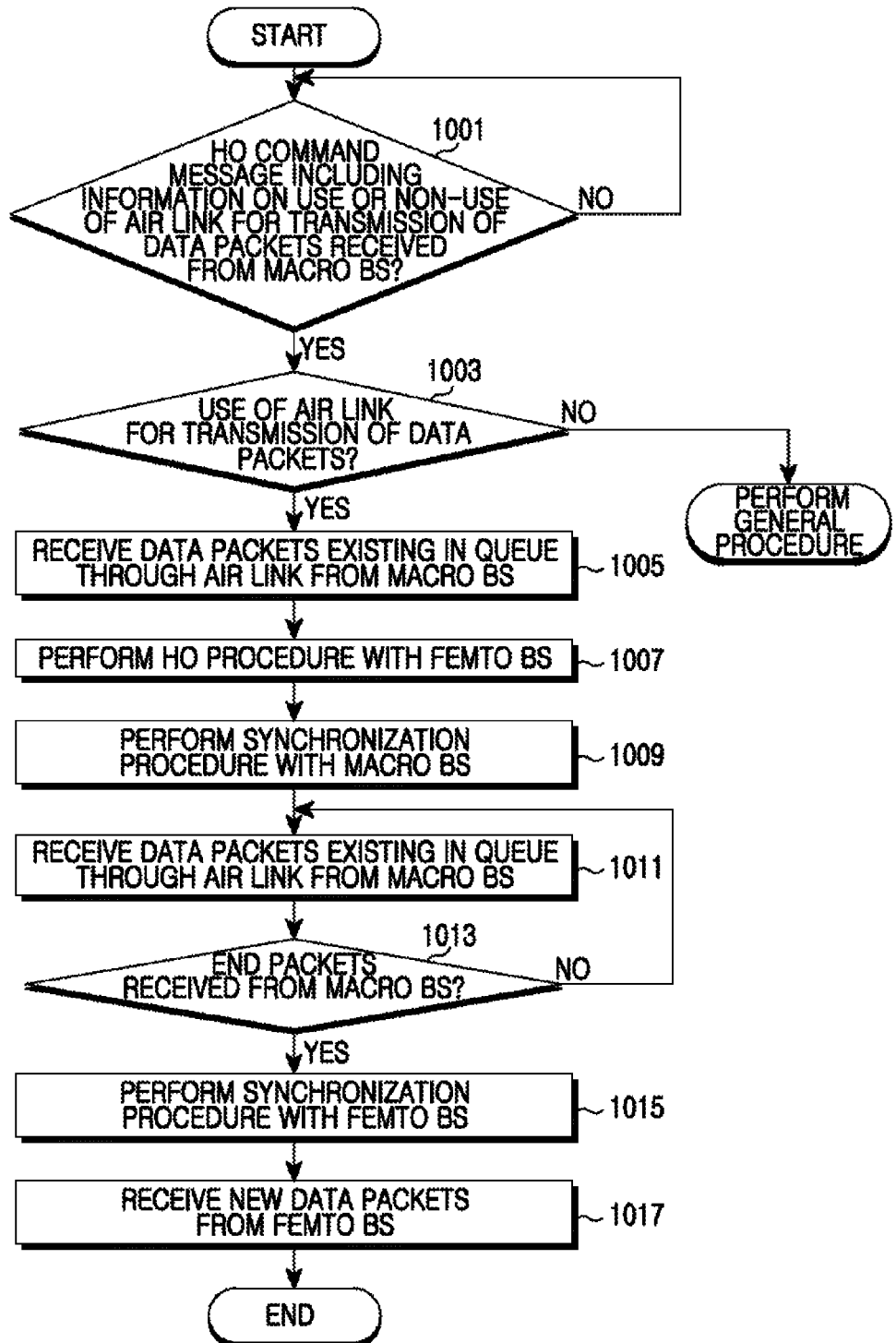
FIG. 10 is a flowchart illustrating an operation for an MS to receive a transmission of data packets according to an exemplary embodiment of the present invention.

FIG. 10 is a flowchart illustrating an operation for an MS to receive a transmission of data packets according to an exemplary embodiment of the present invention.

Referring to FIG. 10, in step 1001, the MS determines if a HO command message, which includes information on the use or non-use of an air link for a transmission of data packets, is received from the macro BS.

If it is determined in step 1001 that the HO command message is received from the macro BS, the MS proceeds to step 1003 and determines if the information on the use or non-use of the air link represents the use of the air link for the transmission of the data packets.

If it is determined in step 1003 that the information on the use or non-use of the air link represents the use of a wired link for a transmission of data packets, the MS performs a general procedure, i.e., a procedure of receiving data packets existing in a queue from the macro BS through the wired link.

On the contrary, if it is determined in step 1003 that the information on the use or non-use of the air link represents the use of the air link for the transmission of the data packets, the MS proceeds to step 1005 and receives the data packets existing in the queue through the air link from the macro BS.

In step 1007, the MS performs a HO procedure with a femto BS and, in step 1009, again performs a synchronization procedure with the macro BS. Here, the MS may be in synchronization with the macro BS using synchronization information of when the MS is previously in synchronization with the macro BS before performing the HO procedure with the femto BS. In another implementation, the exemplary embodiment of FIG. 4 is possible.

In step 1011, the MS receives data packets existing in a queue through the air link until end packets are received from the macro BS. In another implementation, until the end packets are received from the macro BS, the MS may be in synchronization with the macro BS or the femto BS while alternately switching the macro BS and the femto BS every frame or at a constant frame period. At this time, in a state of being in synchronization with the macro BS, the MS may receive data packets through the air link from the macro BS and, in a state of being in synchronization with the femto BS, the MS may receive new data packets through the air link from the femto BS. Here, the MS may be in synchronization with the macro BS using synchronization information of when the MS is previously in synchronization with the macro BS before performing the HO procedure with the femto BS, and may be in synchronization with the femto BS using synchronization information acquired in the HO procedure performance process with the femto BS.

In step 1013, the MS determines if the end packets are received from the macro BS. If it is determined that the end packets are not received in step 1013, the MS returns to step 1011 and repeatedly performs subsequent steps.

On the other hand, if it is determined that the end packets are received in step 1013, the MS proceeds to step 1015 and performs a synchronization procedure with the femto BS. In step 1017, the MS receives new data packets from the femto BS. Here, the MS may be in synchronization with the femto BS using the synchronization information, which is acquired in the HO procedure performance process with the femto BS.

After that, the MS terminates the operation according to the exemplary embodiment of the present invention.

In an exemplary implementation, instead of performing the synchronization procedure with the macro BS or the femto BS in step 1009 or 1015, the MS may send the macro BS a message requesting the macro BS to transmit data packets existing in a queue or send the femto BS a message requesting the femto BS to transmit new data packets. For this purpose, the MS must include wait request information in a HO confirm message sent to the femto BS in the HO procedure performance process of step 1007, and request the femto BS to wait for transmission of new data packets until there is subsequently a request for transmission of new data packets.

Figure 11:
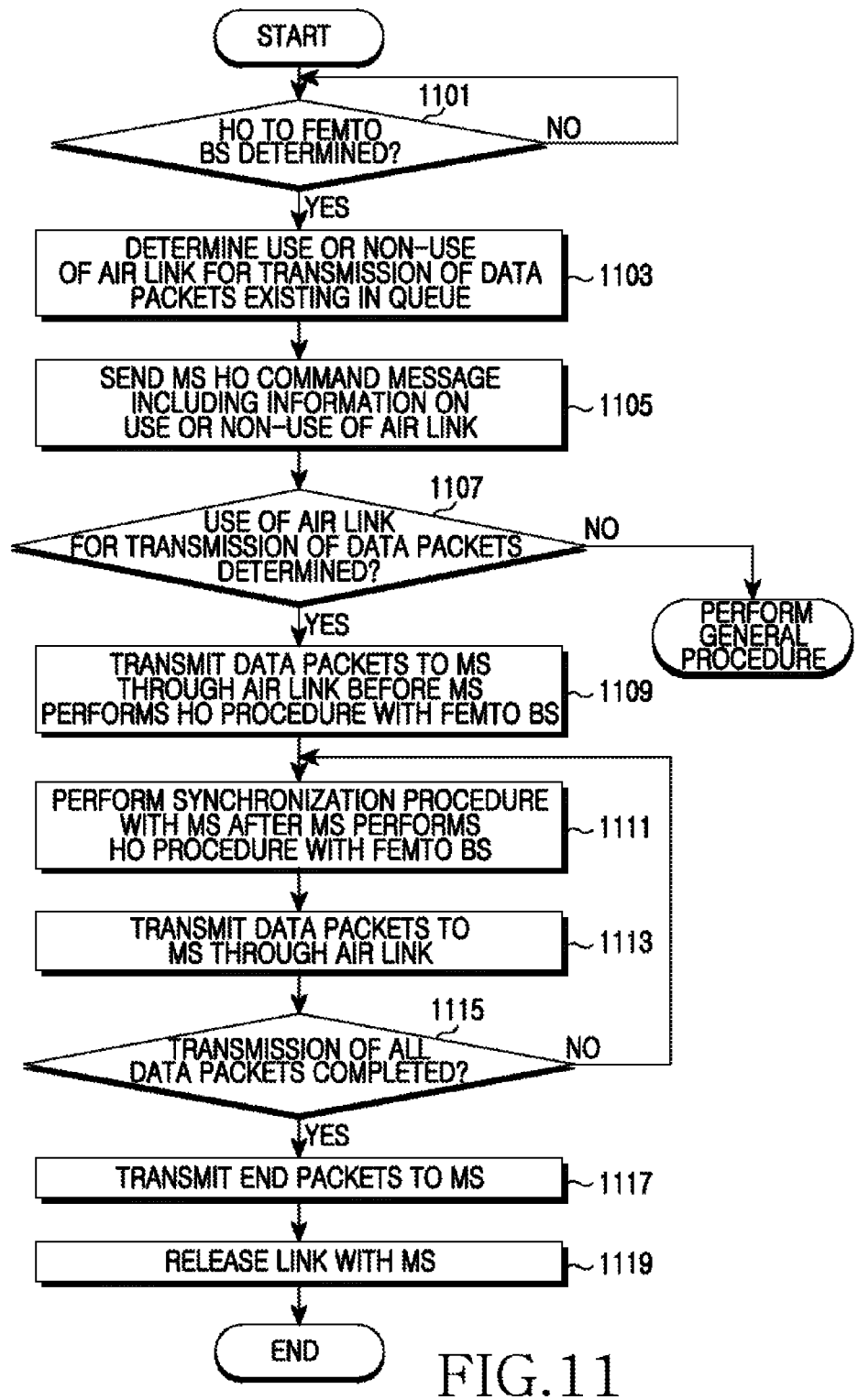
FIG. 11 is a flowchart illustrating an operation for a macro BS to transmit data packets according to an exemplary embodiment of the present invention.

FIG. 11 is a flowchart illustrating an operation for a macro BS to transmit data packets according to an exemplary embodiment of the present invention.

Referring to FIG. 11, in step 1101, the macro BS determines if a HO of the MS to a femto BS is determined. According to a HO request of the MS or in a case in which the macro BS judges that there is a need for the HO of the MS to the femto BS, the macro BS may determine the HO of the MS.

When the HO of the MS to the femto BS is determined in step 1101, the macro BS proceeds to step 1103 and determines the use or non-use of an air link for a transmission of data packets existing in a queue. That is, the macro BS determines whether to transmit data packets existing in a queue to the MS through a wired link or whether to transmit the data packets through the air link. At this time, the macro BS may predict if the data packet transmission through the air link will improve performance and, in a case in which it is determined that performance improvement is possible, the macro BS may determine to transmit the data packet through the air link. Here, a criterion for determining whether to transmit the data packet through the air link may be variously set. In an exemplary implementation, for the MS to receive data packets through the air link directly from the macro BS requires a good state of the air link and thus, in a case in which a receive signal level from the MS is equal to or greater than a predetermined level, the macro BS may determine a data transmit through the air link. Otherwise, the macro BS may determine to transmit data through the wired link. In another exemplary implementation, in a case in which latency resulting from the data transmission through the wired link is equal to or greater than a predetermined level, the macro BS may determine to transmit the data through the air link. Otherwise, the macro BS may determine to transmit the data through the wired link. In addition, the macro BS may determine whether to transmit the data through the air link by way of various indicators such as traffic loading, etc.

In step 1105, the macro BS sends the MS a HO command message including information on the use or non-use of an air link, and commands the MS to receive data packets transmitted through the wired link or the air link.

In step 1107, the macro BS determines if the macro BS determines the use of the air link for the transmission of the data packets. When it is determined to use the wired link for the transmission of the data packets in step 1107, the macro BS performs a general procedure, i.e., a procedure of transmitting data packets existing in a queue to the MS through the wired link.

On the contrary, when it is determined to use the air link for the transmission of the data packets in step 1107, the macro BS proceeds to step 1109 and transmits data packets existing in a queue to the MS through the air link before the MS performs a HO procedure with a femto BS. Here, until just before the MS performs the HO procedure with the femto BS, the data packet transmission process through the air link is fulfilled during a constant time or until the macro BS exhausts all data packets designated for the MS in its possession.

In step 1111, the macro BS performs a synchronization procedure with the MS after the MS performs the HO procedure with the femto BS. In step 1113, the macro BS transmits the data packets to the MS through the air link until the transmission of the data packets is completed. In another exemplary implementation, until the transmission of the data packets is completed, the macro BS may be in synchronization with the MS every frame or at a constant frame period, and transmit the data packets to the MS through the air link in a state of synchronization with the MS.

In step 1115, the macro BS determines if the transmission of the data packets is completed. When it is determined that the transmission of the data packets is not completed in step 1115, the macro BS returns to step 1113 and repeatedly performs subsequent steps.

On the contrary, when it is determined that the transmission of the data packets is completed in step 1115, the macro BS proceeds to step 1117 and transmits end packets to the MS. In step 1119, the macro BS releases a link with the MS and then, terminates the operation according to the exemplary embodiment of the present invention.

In an exemplary implementation, instead of performing the synchronization procedure with the MS in step 1111, the macro BS may receive, from the MS, a message requesting the macro BS to transmit data packets existing in a queue.

Figure 12:
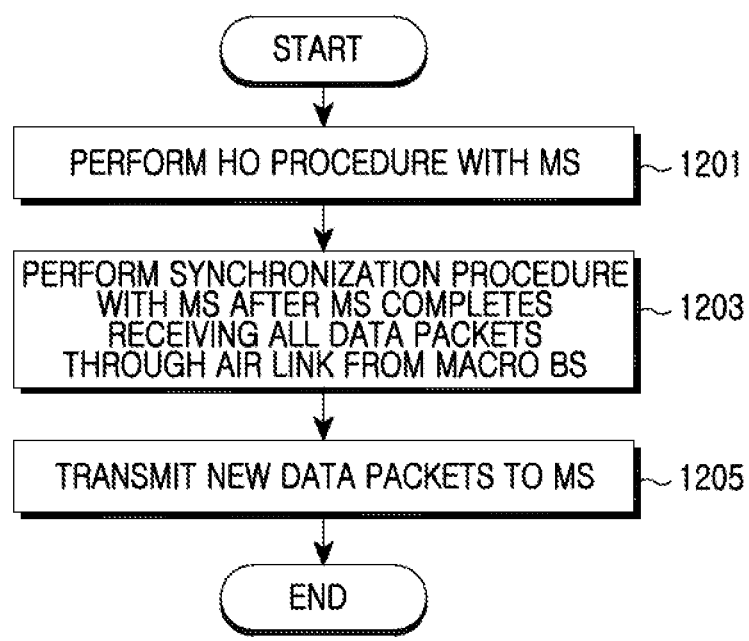
FIG. 12 is a flowchart illustrating an operation of a femto BS while an MS receives a transmission of data packets according to an exemplary embodiment of the present invention.

FIG. 12 is a flowchart illustrating an operation of a femto BS while an MS receives a transmission of data packets according to an exemplary embodiment of the present invention.

Referring to FIG. 12, in step 1201, the femto BS performs a HO procedure with the MS.

In step 1203, the femto BS performs a synchronization procedure with the MS after the MS receives all data packets through the air link from the macro BS.

In step 1205, the femto BS transmits new data packets to the MS.

Then, the femto BS terminates the operation according to the exemplary embodiment of the present invention.

In an exemplary implementation, instead of performing the synchronization procedure with the MS in step 1203, the femto BS may receive, from the MS, a message requesting the femto BS to transmit new data packets. For this purpose, the MS must include wait request information in a HO confirm message sent to the femto BS, in the HO procedure performance process of step 1201, and request the femto BS to wait for transmission of new data packets until there is subsequently a request for transmission of new data packets.

As described above, exemplary embodiments of the present invention have an advantage of, in a case in which an MS performs a HO from a macro cell to a femto cell in a wireless communication system in which the macro cell and the femto cell coexist, when a macro BS transmits data packets existing in a queue to the MS, the transmitting of the data packets directly to the MS through an air link, not through a wired link going through a backbone network (i.e., a core network) and an ISP network, removes latency caused by the ISP network and, by this, decreases a HO interruption time. Such decrease of the HO interruption time may make a seamless handover possible and further, reduce a service cut-off phenomenon.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a Mobile Station (MS) for data forwarding in a wireless communication system, the method comprising:
performing a HandOver (HO) procedure from a serving Base Station (BS) to a target BS;
synchronizing with the serving BS after completing the HO procedure with the target BS;
receiving data packets existing in a queue through an air link directly from the serving BS;
synchronizing with the target BS when packets informing of the end of data packets are received from the serving BS; and
receiving new data packets from the target BS.

2. The method of claim 1, wherein the serving BS comprises a macro BS, and the target BS comprises a femto BS.

3. The method of claim 1, further comprising receiving a HO command message that includes information on the use or non-use of an air link for forwarding of data packets, from the serving BS.

4. The method of claim 3, further comprising, after receiving the HO command message, receiving the data packets existing in the queue through the air link directly from the serving BS, until performing the HO procedure with the target BS.

5. An operation method of a Mobile Station (MS) for data forwarding in a wireless communication system, the method comprising:
performing a HandOver (HO) procedure from a serving Base Station (BS) to a target BS;
after completing the HO procedure with the target BS, synchronizing with the serving BS at a previously negotiated serving BS frame start time point;
receiving data packets existing in a queue through an air link directly from the serving BS;
switching synchronization at a previously negotiated target BS frame start time point, and synchronizing with the target BS; and
receiving new data packets from the target BS.

6. The method of claim 5, further comprising:
receiving a HO command message that includes at least one of information on whether to switch a serving BS frame and a target BS frame and information on a time point of a start of the serving BS frame; and
performing the HO procedure with the target BS,
wherein the HO procedure comprises sending the target BS a HO confirm message that includes at least one of information on whether to switch a serving BS frame and a target BS frame and information on a time point of a start of the serving BS frame.

7. An operation method of a Mobile Station (MS) for data forwarding in a wireless communication system, the method comprising:
performing a HandOver (HO) procedure from a serving Base Station (BS) to a target BS;
requesting the serving BS to forward data packets existing in a queue, after completing the HO procedure with the target BS;
receiving the data packets existing in the queue through an air link directly from the serving BS;
sending the target BS a message requesting the target BS to transmit new data packets, when packets informing of the end of data packets are received from the serving BS; and
receiving new data packets from the target BS.

8. The method of claim 7, further comprising performing the HO procedure with the target BS according to reception of a HO command message,
wherein the HO procedure comprises sending the target BS a HO confirm message that includes information requesting the target BS to wait for transmission of new data packets until there is subsequently a request for transmission of new data packets.

9. An operation method of a serving Base Station (BS) for data forwarding in a wireless communication system, the method comprising:
determining the use or non-use of an air link for forwarding of data packets of a Mobile Station (MS) existing in a queue;
when determining the use of the air link for the forwarding of the data packets, synchronizing with the MS at a time point at which the MS completes a HandOver (HO) procedure with a target BS; and
forwarding the data packets existing in the queue directly to the MS through the air link.

10. The method of claim 9, wherein the serving BS comprises a macro BS, and the target BS comprises a femto BS.

11. The method of claim 9, further comprising sending the MS a HO command message that includes information on the use or non-use of an air link for forwarding of data packets.

12. The method of claim 11, further comprising, after sending the HO command message, forwarding the data packets existing in the queue directly to the MS through the air link until the MS performs the HO procedure with the target BS.

13. The method of claim 9, wherein the determining of the use or non-use of the air link comprises determining if performance improvement is possible through the use of the air link.

14. A wireless communication system for data forwarding, the system comprising:
a Mobile Station (MS) for performing a HandOver (HO) procedure from a serving Base Station (BS) to a target BS, after completing the HO procedure with the target BS, synchronizing with the serving BS; and
the serving BS for, at a time point at which the MS completes the HO procedure with the target BS, synchronizing with the MS, and for forwarding data packets existing in a queue directly to the MS through an air link.

15. The system of claim 14, wherein the serving BS comprises a macro BS, and the target BS comprises a femto BS.

16. The system of claim 14, wherein the serving BS determines the use or non-use of the air link for the forwarding of the data packets of the MS existing in the queue, and sends the MS a HO command message that includes information on the use or non-use of an air link for forwarding of data packets.

17. The system of claim 16, wherein, after sending the HO command message, the serving BS forwards the data packets existing in the queue directly to the MS through the air link until the MS performs the HO procedure with the target BS.

18. The system of claim 16, wherein the serving BS determines the use or non-use of the air link for the forwarding of the data packets of the MS existing in the queue, according to whether performance improvement is possible through the use of the air link.

19. The system of claim 14, wherein, when completing the data packet forwarding, the serving BS transmits packets informing of the end of data packet forwarding, to the MS, and
wherein, when the packets informing of the end of the data packet forwarding are received from the serving BS, the MS is in synchronization with the target BS and receives new data packets from the target BS.

20. A wireless communication system for data forwarding, the system comprising:
a Mobile Station (MS) for performing a HandOver (HO) procedure from a serving Base Station (BS) to a target BS, after completing the HO procedure with the target BS, synchronizing with the serving BS at a previously negotiated serving BS frame start time point, receiving data packets existing in a queue through an air link directly from the serving BS, switching synchronization at a previously negotiated target BS frame start time point, synchronizing with the target BS, and receiving new data packets from the target BS;
the serving BS for synchronizing with the MS at the previously negotiated serving BS frame start time point, and for forwarding the data packets existing in the queue directly to the MS through the air link; and
the target BS for synchronizing with the MS at the previously negotiated target BS frame start time point, and for transmitting new data packets to the MS.

21. The system of claim 20, wherein the serving BS sends the MS a HO command message that includes at least one of information on whether to switch a serving BS frame and a target BS frame and information on a time point of a start of the serving BS frame, and
wherein the MS sends the target BS a HO confirm message that includes at least one of information on whether to switch a serving BS frame and a target BS frame and information on a time point of a start of the serving BS frame, which are acquired according to reception of the HO command message.

22. A wireless communication system for data forwarding, the system comprising:
a Mobile Station (MS) for performing a HandOver (HO) procedure from a serving Base Station (BS) to a target BS, after completing the HO procedure with the target BS, sending the serving BS a message requesting the serving BS to forward data packets existing in a queue and receiving data packets existing in a queue through an air link directly from the serving BS, and, when packets informing of the end of the data packets are received from the serving BS, sending the target BS a message requesting the target BS to transmit new data packets and receiving new data packets from the target BS;
the serving BS for, when the message requesting the serving BS to forward the data packets existing in the queue is received from the MS, forwarding the data packets existing in the queue directly to the MS through the air link; and
the target BS for, when the message requesting the target BS to transmit the new data packets is received from the MS, transmitting new data packets to the MS.

23. The system of claim 22, wherein the serving BS sends a HO command message to the MS, and wherein, according to reception of the HO command message, the MS sends the target BS a HO confirm message, including information requesting the target BS to wait for transmission of new data packets until there is subsequently a request for transmission of new data packets.

* * * * *